March 18, 1952    A. F. HAYEK    2,589,940
INTERMITTENT MOVEMENT
Filed July 8, 1949    2 SHEETS—SHEET 1

Inventor
ARTHUR F. HAYEK
By
H. L. Mackey
Attorney

March 18, 1952     A. F. HAYEK     2,589,940
INTERMITTENT MOVEMENT

Filed July 8, 1949     2 SHEETS—SHEET 2

Inventor
ARTHUR F. HAYEK

Attorney

Patented Mar. 18, 1952

2,589,940

UNITED STATES PATENT OFFICE 2,589,940

INTERMITTENT MOVEMENT

Arthur F. Hayek, Pleasantville, N. Y., assignor to General Precision Laboratory Incorporated, a corporation of New York Application July 8, 1949, Serial No. 103,571

6 Claims. (Cl. 74—436)

This invention relates to an intermittent movement for motion picture projectors and particularly for projectors used in the televising of motion picture film.

In the motion picture art a rate of movement of the film of 24 frames per second has become standard, while in the television art the field rate of 60 per second is standard. In televising a motion picture film the film must obviously present a stationary aspect while being viewed by the television pick-up tube, and these requirements, together with limitations set by the pick-up tube on the time and duration of illumination result in definite limitations on methods for advancing the motion picture film.

Among permissible methods in which the film is moved intermittently is one in which the pauses of the film are alternately long and short, alternate frames being scanned by the television tube three times during each pause or stationary period of the film, while the remaining frames are scanned only twice.

This type of motion may in general be accomplished in two ways. In one the film motion or pull-down operation is accomplished within a time that is not greater than 13.3% of a frame cycle or 48°, considering the duration of one cycle to be 360°. This type of motion, requiring a fast pull-down, has not so far been universally applied with success because it is liable to tear the film.

Another way of accomplishing film pull-down with alternately long and short periods of film rest employs an asymmetrical intermittent mechanism. The mechanism of the instant invention utilizes this latter method and employs a star wheel somewhat similar to that employed in a Geneva stop mechanism, with from five to eight lobes. Its drive shaft has a constant speed, and carries two pin cams which are alternately caused to engage the star wheel when they are oscillated lengthwise. The pins carried by the pin cams are so positioned that the impulses given by them to the star wheel occur at intervals which alternate between values having the ratio of 2 to 3. The star wheel advances the film strip in the usual manner.

Keeping the advantages of this method of operation in mind, the purpose of this invention is to provide an improved mechanism for intermittently advancing motion picture film through a projector with alternately long and short frame projection periods.

This invention will be more readily understood from the following detailed description together with the attached drawings in which.

Figure 1:
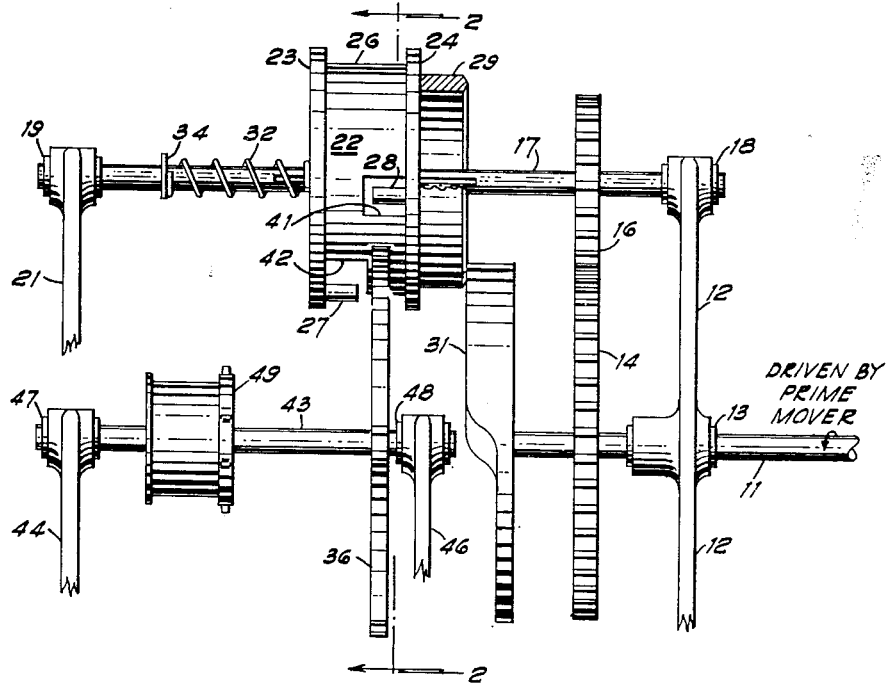
Figure 1 illustrates diagrammatically a preferred form of the invention.

Referring now to Figure 1, a shaft 11 rotatably mounted in the frame member 12 by a suitable bearing 13 is rotated at a speed of 12 R. P. S. by a suitable driving motor and gearing means (not shown). The shaft 11 carries a gear 14 affixed thereto and rotatable therewith which in turn meshes with a gear 16 affixed to a shaft 17. The shaft 17 is rotatably supported in bearings 18 and 19 carried by frame members 12 and 21 and the ratio of the gears 14 and 16 is such that the shaft 17 rotates two revolutions for every single revolution of the shaft 11, that is to say 24 R. P. S.

A pin cam member 22 is keyed or splined to the shaft 17 so that the pin cam is constrained to rotate with the shaft but is permitted limited longitudinal movement thereon. The pin cam 22 consists of opposed flanged portions 23 and 24 connected by a generally cylindrical portion 26, the opposed flanged portions each being provided with a pin 27 and 28 angularly offset from each other by an angle of 72°. Additionally the flange 24 is provided on its outer face with a rim 29 which bears against a cam disc 31 affixed to and rotatable by the shaft 11. A spring 32 having one end bearing against a collar 34 on the shaft 17 and the other end against the flange 23 of the pin cam member 22 urges the rim member 29 in intimate contact with the face of the cam disc 31 so that as the cam disc 31 is revolved the combined action of the spring 32 and cam disc 31 serve to vary the longitudinal position of the pin cam member 22, the pin cam member being positioned in its extreme left-hand position as viewed in Figure 1 during the period of approximately one-half of revolution of the shaft 11 and cam disc 31 and in its extreme right-hand position during the remaining half revolution of the shaft 11 and cam disc 31. Since the shaft 17 carrying the pin cam member 22 makes two complete revolutions during one complete rotation of the shaft 11 and cam disc 31, the pin cam member 22 is alternately displaced longitudinally of the shaft 17 for alternate periods of single complete revolutions of the pin cam member 22.

Figure 2:
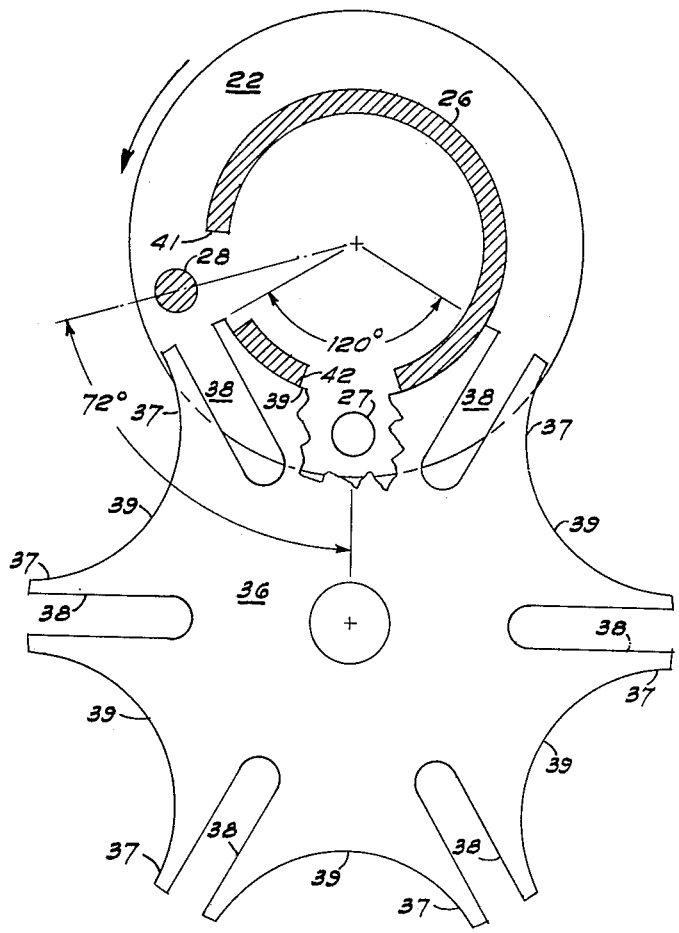
Figure 2 is a cross-sectional view taken on the line 2—2 of Figure 1 depicting the star wheel and the pin cams.

Cooperating with the pin cam member 22 for intermittent rotation thereby, there is provided a star wheel 36 having as indicated in Figure 2 six lobes 37 each of which is provided with a slot 38. The star wheel 36 is provided with arcuate surfaces 39 extending between each of the lobes 37 which surfaces have the same degree of curvature as the cylindrical portion 26 of the pin cam member 22 so that during a portion of the revolution of the pin cam member 22 the star wheel 36 and the mechanism associated therewith is held perfectly stationary. During the remaining portion of the revolution of the pin cam member 22 one or the other of the pins 27 or 28 will engage a slot 38 and the star wheel will be caused to rotate through an angle of 60°, the cylindrical surface 26 being interrupted at 41 and 42 to permit rotation of the star wheel 36 about its axis without interference between a respective lobe 37 and the cylindrical surface 26.

Those skilled in the art will recognize that such action constitutes the operation of the usual Geneva movement and that there is thus imparted to the shaft 43 (see Figure 1), to which the star wheel 36 is affixed, alternate periods of rotation and dwell.

The shaft 43 is supported on the frame members 44 and 46 by suitable bearings 47 and 48 and affixed to one end thereof is an intermittent sprocket 49 which engages a film strip (not shown) and which as a result of the intermittent movement imparted thereto by the shaft 43 and star wheel 36 causes the film strip to be intermittently advanced or pulled down and then to be held stationary in proper position.

During any single revolution of the pin cam member 22 only one of the pins 27 or 28 can engage a slot 38 depending on whether the pin cam member has been moved to its right or left positions by the combined action of the spring 32 and cam disc 31 and thus the pins 27 and 28 alternately actuate the star wheel 36 on successive revolutions of the pin cam member 22.

This alternate engagement and actuation of the star wheel 36 and the intermittent sprocket 49 of the pins 27 and 28 is made to give alternate long and short periods during which the film strip is maintained stationary so that with suitable shuttering and television camera equipment of conventional design the pick-up tube carried by the camera is illuminated twice by the light projected through certain of the picture frames on the motion picture strip and three times by the light projected through the alternate picture frames resulting in the desired conversion from 24 motion picture frames to 60 television fields per second.

Referring to Figure 2 the pins 27 and 28 are illustrated as separated by an angular distance of 72°. Assuming that during the first revolution of the pin cam member 22, the pin cam member is positioned longitudinally in such fashion that the pin 28 is caused to engage a slot 38 in the star wheel 36, then during the first 120° of rotation of the pin cam member 22, the star wheel 36 is caused to rotate 60° advancing the film strip by actuation of the sprocket 49. In the absence of any other arrangement the star wheel 36 would be held stationary for the next 240° of revolution of the pin cam member 22 when rotation would again occur as a result of the pin 27 engaging the next slot 38 resulting in the usual regular recurrence of intermittent actuation and dwell.

In the present invention, however, when the pin cam member 22 has nearly finished one revolution the pin cam member is moved longitudinally by the cam disc 31 in such fashion that the pin 27 is placed in position to engage a slot 38 in the star wheel 36. Since the pin 27 leads the pin 28 by 72° the star wheel is held stationary for only 240° —72° or 168° and then is moved through an angle of 120° by the pin 27. Before the next revolution is completed the pin cam member 22 is again moved longitudinally so that the pin 28 is in position for engagement of a star wheel slot 38 and in this instance the pin cam member 22 must rotate 240° +72° or 312° before the star wheel 36 can be advanced. There are, then, periods during which the film strip is held stationary for a relatively short period of time alternating with periods during which the film is held stationary for a relatively longer period of time.

Figure 3:
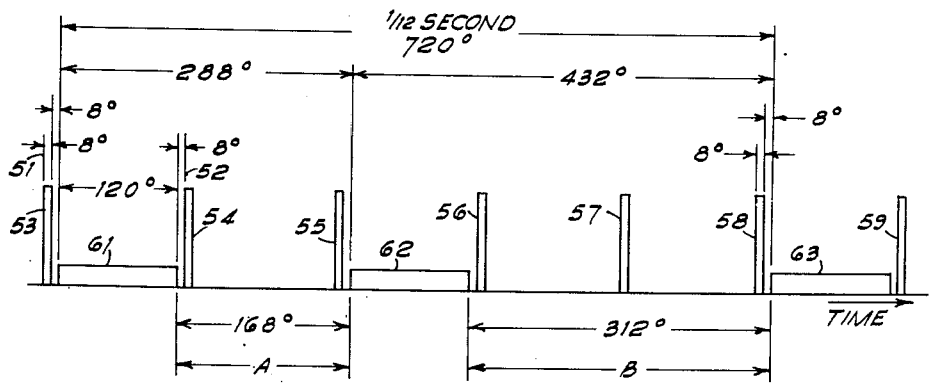
Figure 3 is a graph illustrating time relations in employing the mechanism of this invention.

Time relations in the televising of motion picture film are shown in Figure 3. The horizontal dimension represents time and embraces one complete cycle of $\frac{1}{12}$ second, within which occur two unequal motion picture frames and five equal television scans or fields. The time interval from 51 to 52 represents the duration of one television field and includes a vertical blanking interval 53 during which the television camera tube scanning ray is extinguished and while in this condition is returned to the top of the camera tube screen in preparation for the commencement of a new scan. Illumination of the camera tube screen by the light of the motion picture projector must be confined to this blanking interval or light streaks will be produced in the television picture. This blanking interval available for illumination by the projector may amount to from 5 to 8% of the total field period, but for the purpose of this description the figure is assumed to be 5.5%. Other illumination intervals 54, 55, 56, 57, 58 and 59 occur at equal intervals of $1/60$ second. The $\frac{1}{12}$ second period of one cycle corresponds to two revolutions or 720° of the pin cam 22, Figure 1, and is divided into two unequal periods of 360°±72° or 288° and 432° corresponding to the two unequal periods of operation of this cam in driving the star wheel. Each period includes a 120° interval 61, 62 and 63 during each of which the film is advanced or pulled down by one frame, and a remaining interval A or B during which the film is stationary. Intervals A are 168° in length and include two illumination intervals 54 and 55 while all other intervals B, occurring alternately, are 312° in length and include three illumination intervals 56, 57 and 58. From these relationships it follows that the width of a 5.5% illumination period in terms of the intermittent driving cam cycle is 8°, and the intervals left between illumination periods and pulldown periods, such as between 53 and 61 in Figure 3, are also 8°.

Because the two unequal time intervals, 288° and 432° in this cycle are in the ratio of 2 to 3, permitting alternately two and three screen illuminations during film stationary periods, the requirements for an intermittent mechanism in film television are satisfied. It still is necessary both to synchronize and to phase the television camera operation with the projector operation. Phasing is necessary to secure the mutual time relations of Figure 3 and synchronization is necessary to secure the mutual time relations of Figure 3 and synchronization is necessary to hold these relations. Obviously, in the absence of synchronization the illumination periods 53 will move in time relative to the pulldown periods 61, and from time to time illumination will occur while the film is in motion. Phasing and synchronization can be effected in any of the ways well known to those skilled in this art, employing a suitable shutter for restricting the duration of illumination of the television camera tube by the projector to the 5.5% illumination portions of the television field periods.

Referring again to Figure 3, it becomes obvious that the assumptions upon which the time allocations were made can be varied within wide limits, so long as the illuminations intervals and the pulldown periods do not encroach on each other and so long as alternately two and three illumination intervals occur between pulldown periods. For instance, the pulldown periods can be 136° in width before they fill the space between two illumination intervals. This in turn will permit star wheels with seven or eight lobes to be employed; the use of over eight lobes however, will reduce or entirely eliminate the time allotted for illumination, as will be apparent on analysis of the geometry of Figure 2 under the limitation that when a pin enters and leaves a star wheel slot its motion must be parallel to the slot. Use of a star wheel of less than five lobes is not preferred because of possible interference between the pin cams and the star wheel shaft.

The clutching and declutching action of the pin cams on the star wheel in Figure 1 is produced by a relative longitudinal motion of the pins 27 and 28 and the shaft 43. Therefore, instead of the production of this relative motion by movement of the pin cam 22 as exampled it can as well be accomplished by a movement of the star wheel shaft 43, or by an appropriate combination of movement of both simultaneously.

Figure 4:
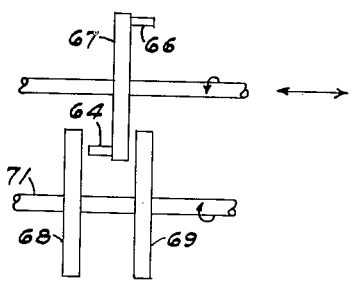
Figure 4 illustrates an alternative mechanism having a single pin cam and two star wheels.

The alternation of two timed actuations of a start wheel shaft can obviously be performed by transpositions of the functions of the pin cams and star wheel of Figure 1. This is illustrated schematically in Figure 4, showing both actuating pins 64 and 66 set in a single pin cam 67 arranged to actuate two separate star wheels 68 and 69 secured to a single star wheel shaft 71.

What is claimed is:

1. An intermittent movement comprising, a driven start wheel having no less than five and no more than eight equally-spaced radial slots, a constant-speed driving member having two driving elements spaced from each other both circumferentially and longitudinally for irregularly intermittently and alternately actuating said star wheel, and means for causing the alternate engagement of said two driving elements with said star wheel.

2. An intermittent movement comprising, a driven start wheel having no less than five and no more than eight equally-spaced radial slots, a constant-speed driving member having two driving elements spaced from each other both circumferentially and longitudinally for irregularly intermittently and alternately driving said star wheel, and means for producing a relative axial reciprocating motion between said driving member and said star wheel to cause engagement alternately of the two driving elements with said driven star wheel for the alternate actuation thereof at two different periods.

3. An intermittent movement for producing motion cycles having alternately periods of 2/60 second and 3/60 second comprising, a driven star wheel having no less than five and no more than eight equally-spaced radial slots, a constant-speed driving pin cam having two driving pins spaced from each other both circumferentially and longitudinally for irregularly intermittently and alternately driving said driven star wheel, and mechanism for axially reciprocating said two driving pins to cause alternate engagement of said two driving pins with said star wheel for the actuation thereof in alternate periods of 2/60 second and 3/60 second.

4. An intermittent movement in accordance with claim 3 in which said mechanism is a cam rotating at one-half of the rotational speed of said driving member.

5. In a motion picture projector, film-advancing means for advancing a film strip into successive positions for the projection of successive frames, and actuating means for operating said film-advancing means so as intermittently and irregularly to move successive film frames into position for projection, said actuating means including; a first driven member discontinuously rotated, a second driving member continuously rotating at constant speed having two actuating members for alternatively and alternating engaging and driving said discontinuously rotated member, means for axially reciprocating said second member whereby one of said actuating members engages said first member during alternate revolutions and other of said actuating members engages said first member during remaining revolutions, and means drivingly interconnecting said discontinuously rotated first member and said film-advancing means to effect movement of successive frames into position for projection after intervals of alternately greater and less duration.

6. An intermittent movement comprising, a Geneva star wheel having at least five radial slots, a rotatable pin cam member having two pins thereon spaced apart longitudinally and circumferentially with respect to each other, and means for moving said Geneva star wheel and said pin cam member axially relative to each other whereby said star wheel slots are alternately engaged by said pins on successive revolutions of said pin cam member.

ARTHUR F. HAYEK.

REFERENCES CITED

The following references are of record in the file of this patent:

UNITED STATES PATENTS

| Number | Name | Date |
| --- | --- | --- |
| 879,496 | Ryon | Feb. 18, 1908 |
| 966,090 | Hamacek | Aug. 12, 1910 |
| 1,166,120 | Fox | Dec. 28, 1915 |

FOREIGN PATENTS

| Number | Country | Date |
| --- | --- | --- |
| 413,881 | Germany | May 18, 1925 |